Feb. 28, 1961  C. A. RIDENOUR ET AL  2,972,849
POWER LAWN MOWER WITH GUARD ATTACHMENT
Filed Aug. 8, 1958  2 Sheets-Sheet 2
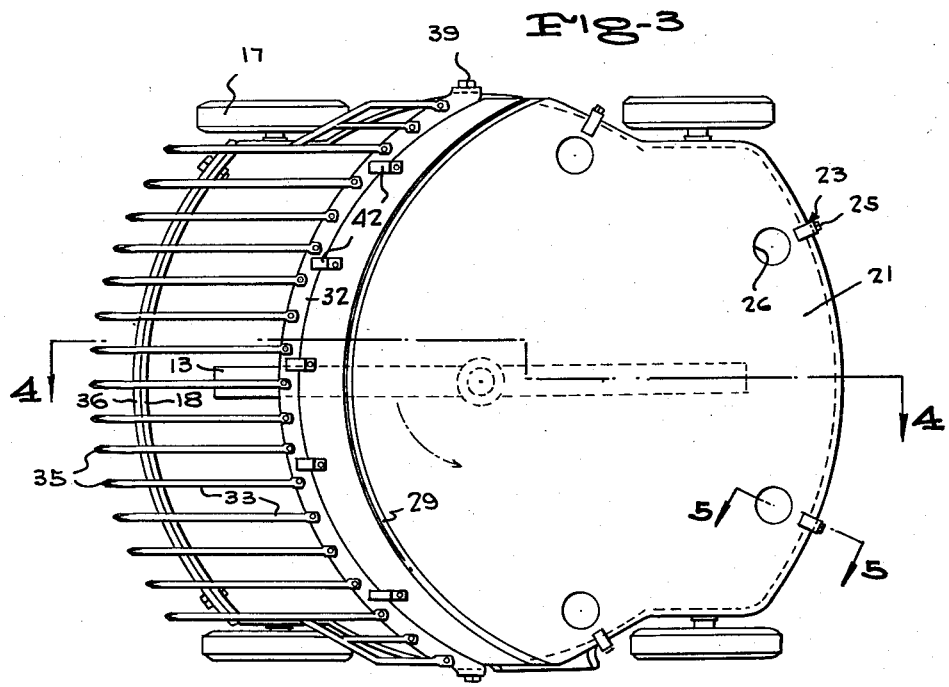
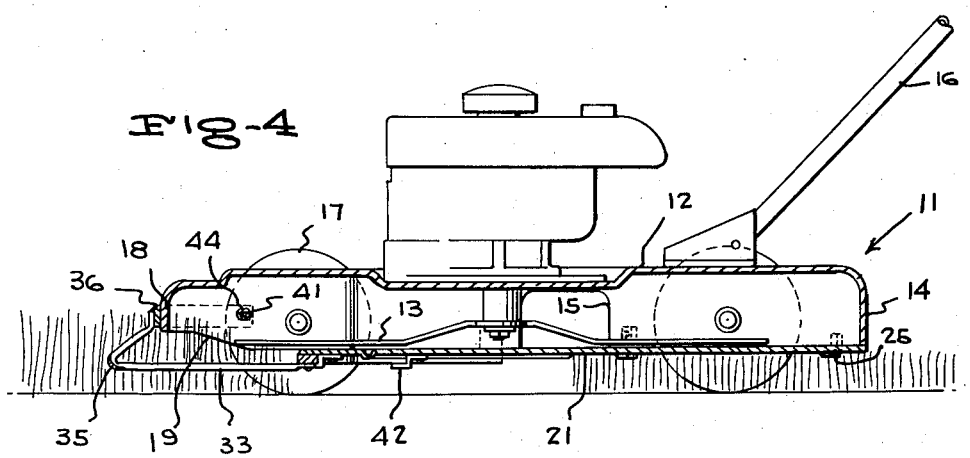
INVENTORS
CHARLES A. RIDENOUR,
EVERETT R. LITTLE &
BY FRANCIS D. IRWIN
McMorrow, Berman & Davidson
ATTORNEYS

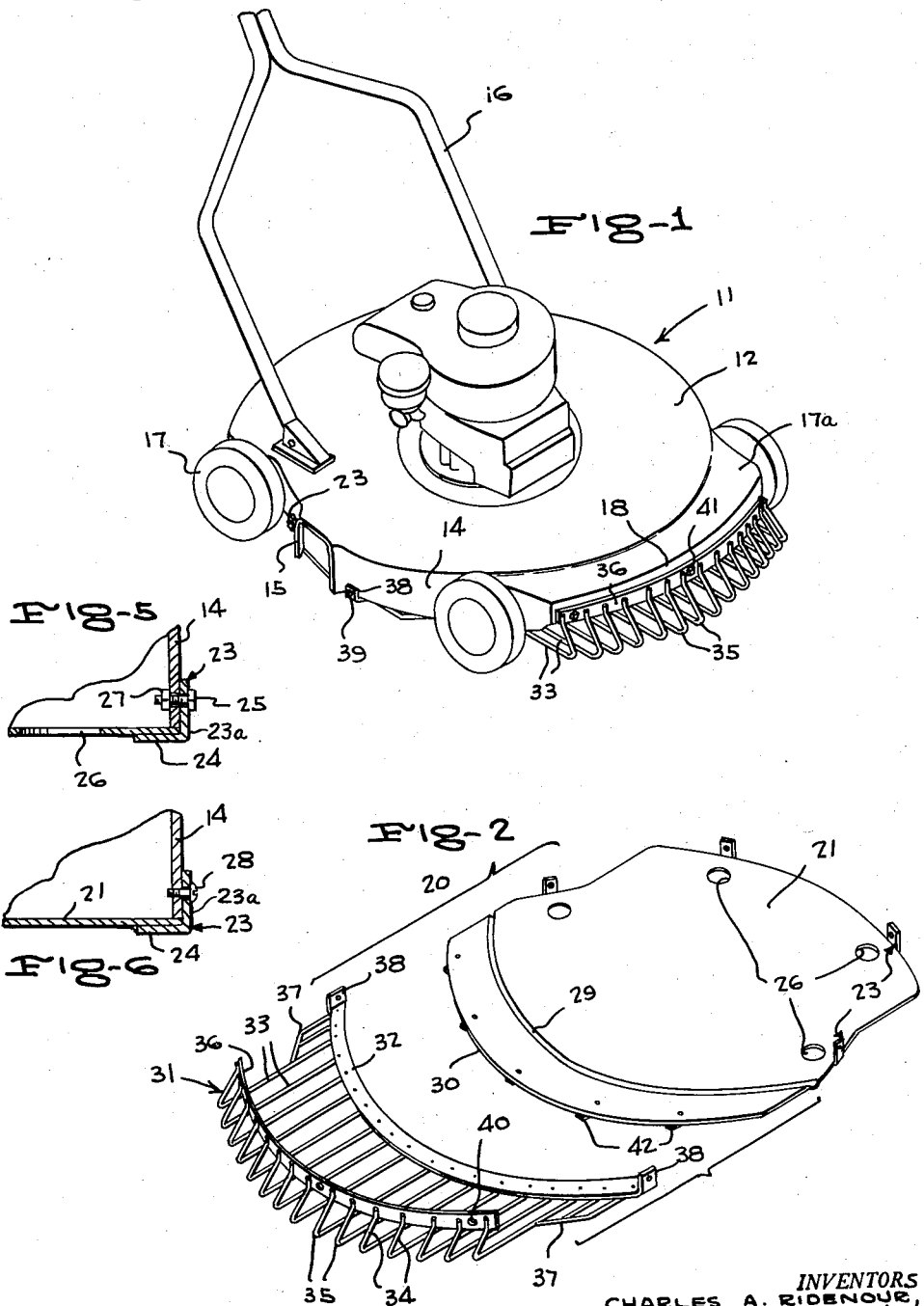

2,972,849
Patented Feb. 28, 1961

2,972,849

POWER LAWN MOWER WITH GUARD ATTACHMENT

Charles A. Ridenour, 100 4th St., Apt. J, Chester, W. Va.; Francis D. Irwin, Wellsville, Ohio (P.O. Box 389, East Liverpool, Ohio); and Everett R. Little, East Liverpool, Ohio (R.D. 1, Bergholz, Ohio)

Filed Aug. 8, 1958, Ser. No. 753,929

1 Claim. (Cl. 56—25.4)

This invention relates to power lawn mowers, and more particularly to a guard attachment for a power lawn mower of the rotary blade type.

A main object of the invention is to provide a novel and improved guard attachment for a power lawn mower of the rotary blade type, said attachment being simple in construction, being easy to install, and greatly increasing the safety of operation of the lawn mower, as well as improving its performance.

A further object tof the invention is to provide an improved guard attachment for a power lawn mower of the type having a wheeled frame provided with a rotary horizontal blade and a depending peripheral skirt or flange, the attachment being inexpensive to fabricate, being durable in construction, being quickly and easily installed on the lawn mower, providing greatly improved safety in operation of the lawn mower, and also providing improved efficiency in the performance of the lawn mower.

Further objects and advantages of the invention will become apparent from the following description and claim, and from the accompanying drawings, wherein:

Figure 1 is a perspective view of a power lawn mower of the rotary blade type provided with an improved guard attachment according to the present invention.

Figure 2 is a perspective view illustrating the major components of the guard attachment employed in Figure 1, the components being shown in separated positions.

Figure 3 is an enlarged bottom view of the lawn mower of Figure 1 and illustrating the manner in which the rotary blades thereof are exposed from beneath at the forward portion of the attachment beyond the forward edge of the main plate of the attachment.

Figure 4 is a longitudinal vertical cross sectional view taken on the line 4—4 of Figure 3.

Figure 5 is an enlarged cross sectional detail view taken on the line 5—5 of Figure 3.

Figure 6 is a cross sectional detail view similar to Figure 5 but illustrating a modification of the invention.

Referring to the drawings, and more particularly to Figures 1 to 5, 11 generally designates a conventional power lawn mower of the type having a wheeled frame 12 provided with a rotary horizontal blade 14. The flange 14 is formed at one portion thereof with an outlet duct 15 permitting the discharge of grass cuttings during the operation of the lawn mower.

As shown, the lawn mower 11 is provided with the usual handle member 16 and with the ground-engaging supporting wheels 17, a pair of such wheels being located on each side of the frame 12 of the mower.

At its forward end, the lawn mower 11 has an extension 17a terminating in a depending flange portion 18 having upwardly and forwardly inclined side edges at its bottom, shown at 19 in Figure 4, whereby to define a receiving opening for grass to be cut as the lawn mower is moved forwardly over the ground.

In accordance with the present invention, a guard assembly is provided, said assembly being designated generally at 20 and comprising a bottom plate 21 adapted to fit beneath the frame 12 and provided at its side and rear edges with upstanding apertured lugs 23. As shown in Figure 5, the lugs 23 may comprise angle brackets having their bottoms 24 welded to the underside of the plate member 21, whereas the vertical arms of the brackets are provided with apertures to receive fastening bolts 25. The plate 21 is formed inwardly adjacent the respective lugs 23 with the large openings 26 to facilitate the engagement of nuts 27 on the inwardly extending bolts 25.

Alternatively, as shown in Figure 6, machine screws 28 may extend through the apertures in the vertical arms of the angle brackets 23a and may be threadedly engaged in the depending peripheral flange 14 of the lawn mower frame 12. This is in contrast with the form of the invention illustrated in Figure 5 wherein the bolts 25 extend through apertures provided in the peripheral flange 14 and are secured by nuts 27 bearing against the inside surface of flange 14.

As shown in Figure 4, the bottom plate 21 terminates a sufficient distance short of the forward end of frame 12 to allow a substantial portion of the horizontal rotary blade 13 of the mower to be exposed below forwardly of the bottom plate 21.

Bottom plate 21 is formed at its forward marginal portion with a reinforcing channel 29 which extends parallel to the arcuate forward edge 30 of the bottom plate and which is spaced therefrom, as shown in Figure 2. The channel 29 acts as a stiffening and bracing means for the forward portion of bottom plate 21.

Designated generally at 31 is a grill which is adapted to be secured between the forward marginal portion of bottom plate 21 and the depending flange portion 18. Thus, the grill 31 comprises an arcuately curved transversely extending rear bar member 32 which is rigidly connected to the rear ends of a plurality of parallel, spaced, longitudinally extending grill rods 33, said grill rods having upwardly and rearwardly inclined forward portions 34 defining vertical, generally U-shaped bends 35 at the forward ends of said grill rods. An arcuately curved, transversely extending bar member 36 is rigidly secured to the top ends of the inclined forward portions 34 of said grill rods, whereby to define a unitary grill structure.

Relatively small corner grill assemblies 37 are provided at the opposite rear corners of the grill 31, as is clearly shown in Figure 2.

The rear bar member 32 is formed at its opposite ends with upwardly extending apertured lugs 38, 38 which are engageable with opposite side portions of the peripheral flange 14 and which may be secured thereto by suitable fastening screws 39. The forward transversely extending arcuate bar member 36 is likewise formed with apertures 40 through which fastening screws 41 may be engaged to secure the bar member 36 to the depending forward flange portion 18 of the lawn mower. The arcuately curved forward marginal portion of plate member 21 is provided with a plurality of spaced, generally S-shaped bracket members 42 defining seats adapted to receive the arcuately curved rear bar member 32 of the grill assembly 31. Thus, the brackets 42 are uniformly spaced along the arcuate forward edge of plate member 21 and receive the arcuately curved bar member 32, the apertured lugs 38, 38 of said bar member being secured to opposite side portions of the peripheral flange 14 of the lawn mower frame, as above described. The forward bar member 36 is fastened to the forward depending flange portion 18 by the screws 41 and by suitable nuts 44 engaged on the inner end portions of said screws, as shown in Figure 4.

Thus, the grill 31 is mounted so that the U-bends 35 project forwardly of the receiving opening defined beneath the extension 17 and act as a combining means to guide the blades of grass through the longitudinal passages defined between the grill rods 33 and into the receiving space beneath the extension 17. The horizontal blade 13 is exposed in said receiving space and projects a substantial distance beyond the forward edge 30 of the bottom guard plate 21, allowing the grass to be neatly and efficiently sheared and allowing the clippings to be whirled tangentially around the interior of the cavity defined between frame 12 and plate 21, being ultimately discharged through the exhaust opening 15.

It will be noted that by closing off a substantial portion of the bottom of the frame 12 in the manner illustrated in Figure 4, a considerable air current is developed within the rear portion of frame 12 which acts as a blower means to evacuate the clippings from the frame 12 through the discharge opening 15.

It will be further noted that no portion of the horizontal rotary blade 13 is exposed at the rear or sides of the lawn mower nor is accessible from beneath the lawn mower at the rear or sides thereof. This greatly increases the safety of operation of the lawn mower and serves to prevent injury to the operator which often occurs because of the exposure of the rotating horizontal blade at the rear or sides thereof.

While certain specific embodiments of an improved guard attachment for a power lawn mower have been disclosed in the foregoing description, it will be understood that various modifications within the spirit of the invention may occur to those skilled in the art. Therefore it is intended that no limitations be placed on the invention except as defined by the scope of the appended claim.

What is claimed is:

In a power lawn mower of the type having a wheeled frame provided with a rotary horizontal blade and a depending peripheral flange, a guard attachment comprising a bottom plate having an arcuately curved, horizontal, forwardly convex forward margin, means rigidly connecting said bottom plate to the bottom edge of said peripheral flange, said bottom plate being of sufficient size to cover the major portion of the underside of said wheeled frame but terminating a sufficient distance short of the forward end of said frame to allow a substantial portion of the horizontal blade to be exposed from below forwardly of the arcuately curved forward margin of said bottom plate at the forward portion of said frame, a grill comprising a plurality of parallel, spaced, longitudinally extending continuous grill rods having upwardly and rearwardly inclined forward portions defining vertical, substantially U-shaped bends at the forward ends of said grill rods, a first arcuately curved horizontal transverse bar member secured to the rear ends of said grill rods, means rigidly mounting said first transverse bar member on the forward margin of said bottom plate, a second arcuately curved transverse bar member vertically secured to the top ends of said inclined forward portions, and means rigidly connecting said second transverse bar member to the bottom marginal portion of the peripheral flange at the forward end of said frame.

References Cited in the file of this patent

UNITED STATES PATENTS

| | | |
|---|---|---|
| 1,880,154 | Rotondo et al. | Sept. 27, 1932 |
| 2,539,779 | Grosso | Jan. 30, 1951 |
| 2,547,328 | Koch et al. | Apr. 3, 1951 |
| 2,557,598 | Daggett | June 19, 1951 |

FOREIGN PATENTS

| | | |
|---|---|---|
| 1,163,635 | France | Apr. 28, 1958 |